(12) United States Patent
Enokida et al.

(10) Patent No.: US 7,799,155 B2
(45) Date of Patent: Sep. 21, 2010

(54) STRUCTURE OF JOINING RESIN MOLDED BODIES

(75) Inventors: Satoshi Enokida, Higashihiroshima (JP); Koichi Fujikawa, Higashihiroshima (JP)

(73) Assignee: Daikyonishikawa Corporation, Hiroshima-Ken (JP)

( * ) Notice: Subject to any disclaimer, the term of this patent is extended or adjusted under 35 U.S.C. 154(b) by 268 days.

(21) Appl. No.: 12/075,539

(22) Filed: Mar. 12, 2008

(65) Prior Publication Data

US 2008/0156412 A1    Jul. 3, 2008

Related U.S. Application Data

(63) Continuation of application No. 11/236,354, filed on Sep. 27, 2005, now abandoned.

(30) Foreign Application Priority Data

Sep. 28, 2004    (JP)    .............................. 2004-281761

(51) Int. Cl.
    *B32B 37/00*    (2006.01)
(52) U.S. Cl. .................................................. 156/73.1
(58) Field of Classification Search ................ 156/73.1, 156/73.5, 308.2, 580.1, 580.2; 264/442, 264/443, 445, 68, 69
    See application file for complete search history.

(56) References Cited

U.S. PATENT DOCUMENTS

| 4,558,957 | A | * | 12/1985 | Mock et al. .................. 368/294 |
| 5,397,408 | A | | 3/1995 | Guzik et al. |
| 6,176,953 | B1 | * | 1/2001 | Landreth et al. ........... 156/73.3 |
| 6,524,675 | B1 | | 2/2003 | Mikami et al. |
| 6,532,928 | B2 | | 3/2003 | Ogata |

FOREIGN PATENT DOCUMENTS

| JP | 5-177712 | 7/1993 |
| JP | 8-132528 | 5/1996 |
| JP | 2002-364469 | 12/2002 |
| JP | 2002 364471 | 12/2002 |

* cited by examiner

*Primary Examiner*—James Sells
(74) *Attorney, Agent, or Firm*—Hamre, Schumann, Mueller & Larson, P.C.

(57) ABSTRACT

A reliable and superior joining strength in entire joining parts of resin molded bodies including tilting portions is obtained by devising a shape and a size of each protrusion for welding provided in the joining parts of the resin molded bodies. The joining parts of upper and lower half bodies 10 and 20 have vertical portions 11 and 13 and vertical portions 21 and 23 respectively vertical to a pressurizing direction and tilting portions 12 and 22 tilting relative to the pressurizing direction, and protrusions for welding 11E to 13E or 21E to 23E are provided in at least the joining part of one of the half bodies. Further, referring to a butting area of the protrusions in a butted state, the butting area in the vertical portions is set to be less than the butting area in the tilting portions.

1 Claim, 7 Drawing Sheets

STRUCTURE OF JOINING RESIN MOLDED BODIES

CROSS REFERENCE TO RELATED APPLICATION

This application is a continuation of U.S. patent application Ser. No. 11/236,354 that was filed with the United States Patent and Trademark Office on Sep. 27, 2005, now abandoned.

BACKGROUND OF THE INVENTION

1. Field of the Invention

The present invention relates to a joining structure of resin molded bodies by means of a vibration welding method while applying a pressure to the pair of resin molded bodies in a state in which joining parts of the pair of resin molded bodies are butted into each other across a substantially entire area of the joining parts.

2. Description of the Related Art

Conventionally, as a generally known method of joining a pair of resin molded bodies is available a so-called vibration welding method, in which a vibration is applied to the resin molded bodies in a state in which joining parts of the pair of resin molded bodies are butted into each other and pressurized so that the pair of resin molded bodies are joined with each other.

However, it is a publicly known problem in joining the resin molded bodies with each other by means of the vibration welding method that it is quite difficult to obtain a reliable and superior joining strength across the entire joining parts due to a generally known difficulty in stably and favorably welding any section of the joining parts tilting relative to a direction in which the pressure is applied (tilting portion) in the case in which a shape of the resin molded bodies are complicated in such manner that the joining parts include not only a section vertical to the pressurizing direction (vertical portion) but also the aforementioned tilting portion.

In order to solve the foregoing problem, for example, Unexamined Japanese Patent Publication Nos. 2002-364469 and 2002-364471 disclose a method of welding a resin structure in which a sufficient increase of a joining strength of a tilting line section on a joining line is pursued in joining the resin molded bodies having a complicated shape.

SUMMARY OF THE INVENTION

The foregoing conventional technology proposed the following two methods; a method in which welding margins of the tilting portions in the pressurizing direction is set to be larger than any other welding margin in the same direction and the tilting portions are welded prior to any other part; and a method in which a pressurizing force is changed in a step of welding the tilting portions and in a step of welding the entire joining parts and the pressurizing force of the latter step is set to be larger than that of the former step.

Yet, it is actually very difficult to attain a reliable and superior joining strength across the entire joining parts in either of the methods.

Therefore, a main object of the present invention is to provide a structure of joining resin molded bodies capable of realizing a reliable and superior joining strength across entire joining parts including tilting parts by devising a shape and a size of each protrusion for welding provided in the joining parts of the resin molded bodies.

In order to achieve the foregoing object, a structure of joining resin molded bodies according to the present invention is a joining structure for joining a pair of resin molded bodies by means of a vibration welding method while applying a pressure to the pair of resin molded bodies in a state in which joining parts of the pair of resin molded bodies are butted into each other across a substantially entire area thereof, wherein the joining parts of the pair of resin molded bodies have vertical portions vertical to a direction in which the pressure is applied and tilting portions tilting relative to the pressurizing direction, the protrusions for welding are provided in at least the joining part of one of the pair of resin molded parts, and a butting area of the protrusions in the vertical portions is set to be narrower than a butting area thereof in the tilting portions in a state in which the protrusions are butted.

The forgoing constitution is preferably adapted to increase the butting area of the protrusions in the vertical portions toward a base of each protrusion.

The protrusions in the pressurizing direction more preferably have a substantially rectangular shape in section in the tilting portions, substantially a triangular shape in section in the vertical portions and substantially a trapezoidal shape in section between the vertical portions and the tilting portions.

Referring to a sectional area of welding margins of the protrusions in a direction orthogonal to a butting surface, the sectional area in the tilting portions is more preferably set to be equal to or more than sectional area in the vertical portions.

In the structure of joining the resin molded bodies according to the present invention, the butting area of the protrusions for welding in the tilting portions in the state in which the protrusions are butted is set to be larger than the butting area thereof in the vertical portions in the same state. Therefore, when the vibration welding is carried out while the pressure is applied to the resin molded bodies in the butted state, a welding area in the tilting portions is larger than a welding area in the vertical portions at least in an initial stage of the welding. As a result, the joining strength in the tilting portion, in which it is generally difficult to obtain a reliable and superior joining strength in comparison to the vertical portion, can be enhanced, and the reliable and superior joining strength can be thereby realized across the entire joining parts.

In the foregoing constitution, the butting area of the protrusions in the vertical portions is preferably set to be larger toward the base of each protrusion. As a result, the welding area in the vertical portions can be increased as the welding advances without necessarily changing the pressurizing force applied to the resin molded bodies though the welding area is relatively small in the initial stage of the welding. Thereby, a required joining strength in the vertical portions can be assured.

Further, the protrusions in the pressurizing direction more preferably have the substantially rectangular shape in section in the tilting portions so that the welding area is substantially constant regardless of the advancement of the welding. As a result, the reliable joining strength can be obtained. In contrast, the protrusions in the pressurizing direction preferably have the substantially triangular shape in section in the vertical directions so that the welding area can be increased as the welding advances. Therefore, the welding area in the vertical portions can be increased as the welding advances without necessarily changing the pressurizing force though the welding area in the initial stage of the welding is relatively small. As a result, the required joining strength in the vertical portions can be assured. Further, the protrusions in the pressurizing direction preferably have the substantially trapezoidal shape in section between the vertical portions and the tilting portions so that a drastic change of the welding area in the joining region from the tilting portions through the vertical portions can be alleviated. As a result, the reliable and superior joining strength can be realized in the entire joining parts.

Further, the sectional area of the welding margins of the protrusions in the direction orthogonal to the butting surface in the tilting portions is more preferably set to be equal to or more than the sectional area thereof in the same direction in the vertical portions so that a welding amount in the tilting portions can be equal to or more than a welding amount in the vertical portions in the direction orthogonal to the butting surface. Thereby, the joining strength in the tilting portions, in which it is generally difficult to obtain the reliable and superior joining strength in comparison to the vertical portion, can be enhanced. As a result, the reliable joining strength can be obtained across the entire joining parts in the direction orthogonal to the butting surface.

DESCRIPTION OF THE PREFERRED EMBODIMENT

Figure 1:
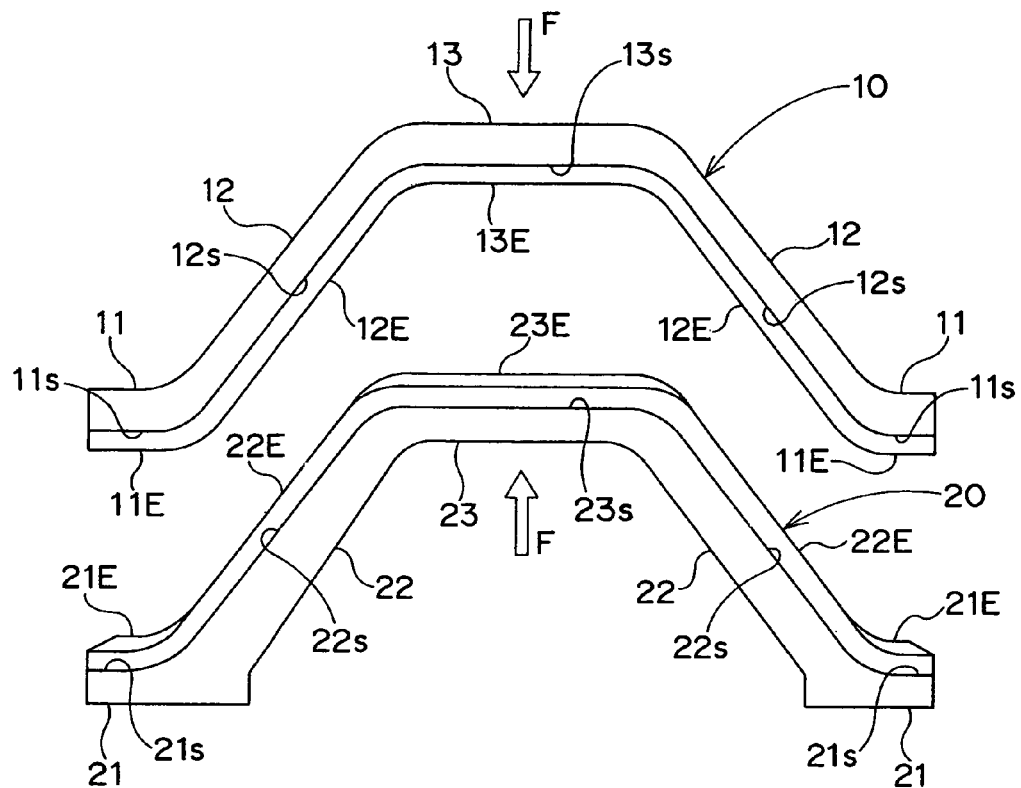
FIG. 1 is a front view of upper and lower half bodies according to an embodiment of the present invention.

Hereinafter, a preferred embodiment of the present invention is described referring to the drawings.

Figure 2:
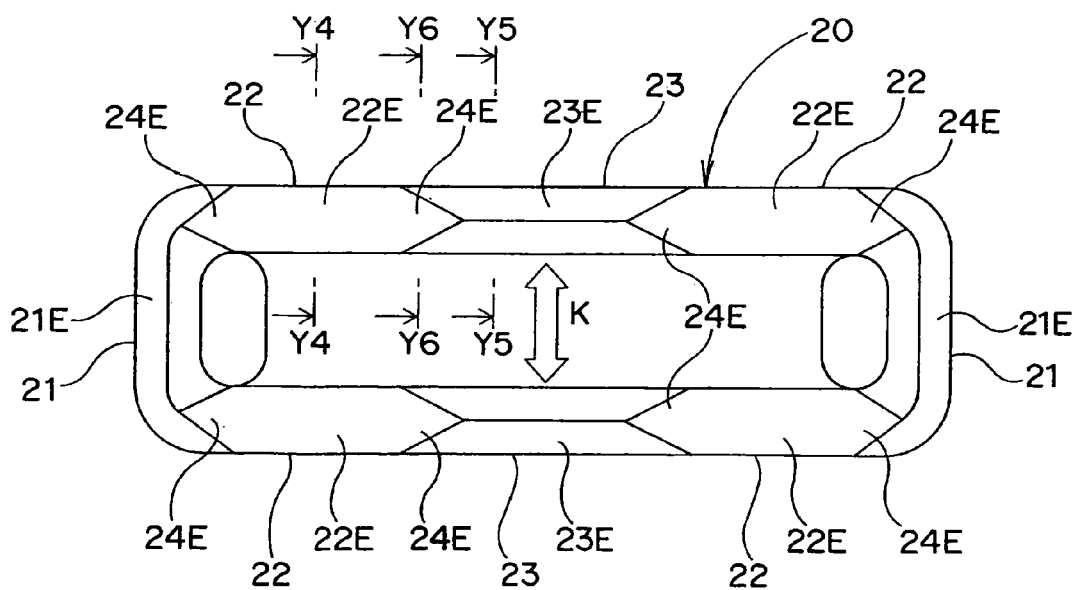
FIG. 2 is a plan view of the lower half body.

FIG. 1 is a front view of an upper half body and a lower half body constituting a pair of resin molded bodies according to the present embodiment. FIG. 2 is a plan view of the lower half body.

As shown in FIG. 1, an upper half body 10 and a lower half body 20 are respectively formed into a saddle shape in front view by left and right lower sides 11 and 21, upper sides 13 and 23 substantially in parallel with the lower sides 11 and 21, and slant sides 12 and 22 connecting the upper sides 13 and 23 and the lower sides 11 and 21. When the half bodies 10 and 20 are vertically butted into each other and thereby joined with each other, an integrated resin product comprising a hollow part is formed. In other words, a lower edge of the upper half body 10 and an upper edge of the lower half body 20 respectively constitute joining parts thereof.

The upper half body 10 and the lower half body 20 are respectively formed from, for example, polyamide resin in which glass reinforced fibers are combined.

When the upper and lower half bodies 10 and 20 are joined with each other, the bodies 10 and 20 are combined with each other in the vertical direction shown in FIG. 1 so that the substantially entire joining parts thereof are butted into each other. Then, in the state in which they are butted into each other, a pressure is applied to both of the half bodies 10 and 20 in a direction indicated by an arrow F shown in FIG. 1, while a vibration of a predetermined vibration number and amplitude is applied thereto at the same time in a direction indicated by a reciprocating arrow K shown in FIG. 2. As a result, the half bodies 10 and 20 are joined with each other by means of the vibration welding method.

In the aforementioned butted state, the lower sides 11 and 21 and the upper sides 13 and 23 of the respective half bodies 10 and 20 are substantially vertical to the pressurizing direction (see arrow F direction), while the slant sides 12 and 22 are tilted relative to the pressurizing direction.

Joining parts 11s and 21s in the lower sides 11 and 21 and joining parts 13s and 23s in the upper sides 13 and 23 of the respective half bodies 10 and 20 correspond to the "vertical portions" recited in the Claims of the present invention, while joining parts 12s and 22s in the slant sides 12 and 22 thereof correspond to the "tilting portions" recited therein.

In the joining parts of the half bodies 10 and 20, protrusions for welding 11E, 12E, 13E, 21E, 22E and 23E are provided in response to the lower sides 11 and 21, the slant sides 12 and 22 and the upper sides 13 and 23. When the half bodies 10 and 20 are butted into each other, the protrusions for welding 11E, 12E and 13E of the upper half body 10 and the protrusions for welding 21E, 22E and 23E of the lower half body 20 are respectively butted into each other.

The protrusions for welding as described above are not necessarily provided in both of the upper and lower half bodies 10 and 20, but may be provided in one of them.

Referring to a butting area in the state in which the protrusions for welding 11E, 12E and 13E and the protrusions for welding 21E, 22E and 23E are respectively butted into each other in the present embodiment, the butting area in the vertical portions vertical to the pressurizing direction (the joining parts 11s and 21s of the lower sides 11 and 21 and the joining parts 13s and 23s of the upper sides 13 and 23) is set to be narrower than the butting area in the tilting portions tilted relative to the pressurizing direction (the joining parts 12s and 22s of the slant sides 12 and 22).

Next, the protrusions for welding in a section along the pressurizing direction (that is, sectional shape in the pressurizing direction) are described.

Figure 3:
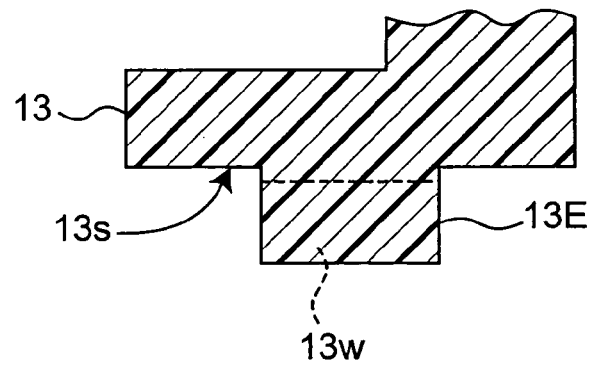
FIG. 3 is a sectional view of a protrusion for welding in the upper half body in a pressurizing direction.

In the present embodiment, the protrusions for welding 11E, 12E and 13E in the vertical portions 11s and 13s and the tilting portion 12s of the upper half body 10 have a same shape in section in the pressurizing direction. Referring to the protrusion for welding 13E in the joining part 13s of the upper side 13, for example, the protrusion 13E including a welding margin 13w has a substantially rectangular shape in section as shown in FIG. 3.

Referring to the lower half body 20, the protrusions for welding 21E and 23E in the vertical portions 21s and 23s and the protrusion for welding 22E and the tilting portion 22s are arranged to have different sectional shapes in the pressurizing direction.

Figure 4:
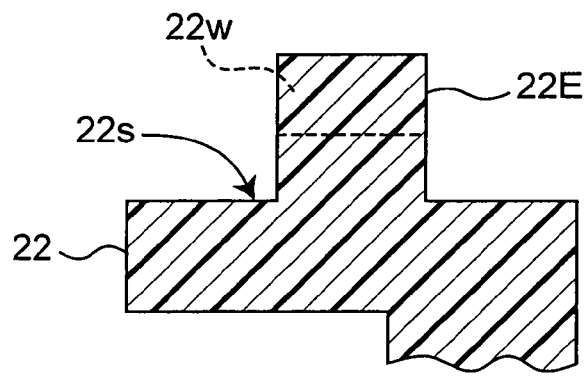
FIG. 4 is a sectional view of a protrusion for welding in a tilting portion of the upper half body in the pressurizing direction.
Figure 5:
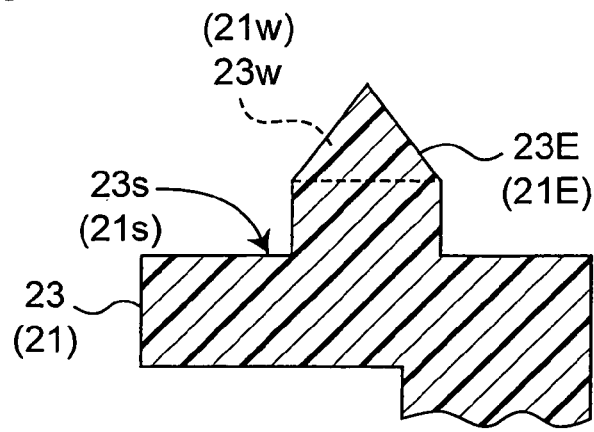
FIG. 5 is a sectional view of a protrusion for welding in a vertical portion of the upper half body in the pressurizing direction.

More specifically, the protrusion for welding 22E in the tilting portion 22s including a welding margin 22w has the substantially rectangular shape in section in the pressurizing direction as shown in FIG. 4. Referring to the sectional shapes of the protrusions for welding 21E and 23E in the vertical portions 21s and 23s in the pressurizing direction, the protrusion for welding 23E in the joining part 23s of the upper side 23, for example, has the substantially rectangular shape from a base through an intermediate position thereof and a substantially triangular shape in section at an edge side thereof (that is, a welding margin 23w) as shown in FIG. 5.

Figure 6:
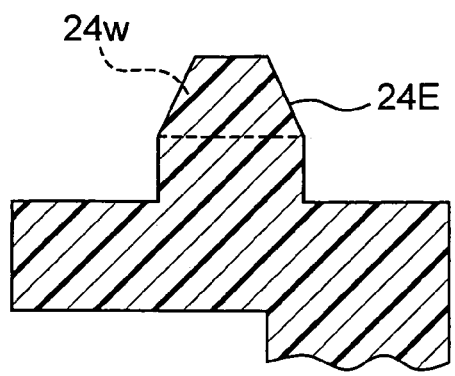
FIG. 6 is a sectional view of a protrusion for welding between the tilting portion and the vertical portion of the upper half body in the pressurizing direction.
Figure 7:
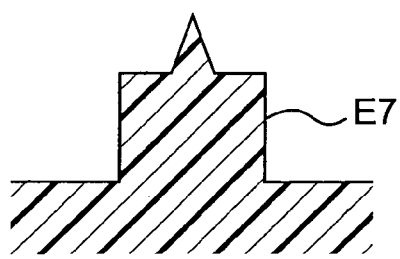
FIG. 7 is a sectional view of a modification example of the protrusion for welding in the vertical portion of the upper half body in the pressurizing direction.
Figure 8:
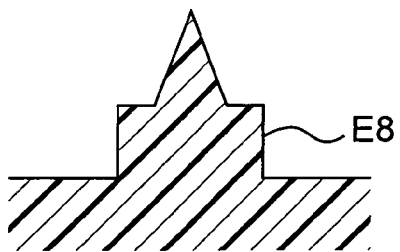
FIG. 8 is a sectional view of a modification example of the protrusion for welding in the vertical portion of the upper half body in the pressurizing direction.

The protrusion for welding 24E between the vertical portions 21s and 23s and the tilting portion 22s has the substantially rectangular shape in section in the pressurizing direction from a base through an intermediate position thereof and a substantially trapezoidal shape at an edge side thereof (that is, a welding margin 24w) as shown in FIG. 6.

Because the protrusions for welding 11E, 12E and 13E of the upper half body 10 and the protrusions for welding 21E, 22E and 23E of the lower half body 20 are arranged to have the foregoing shapes in section in the pressurizing direction, the butting area in the tilting portions 12s and 22s is larger than the butting area in the vertical portions 11s and 21s and in the vertical portions 13s and 23s in the state in which the protrusions for welding are butted.

Therefore, when the vibration welding is carried out while the half bodies 10 and 20 are pressurized in the butted state, a welding area of the tilting portions 12s and 22s is larger than welding area of the vertical portions 11s and 21s and the vertical portions 13s and 23s at least in an initial stage of the welding (in the present embodiment, until the welding in the entire welding margins is completed). Thereby, a joining strength can be enhanced in the tilting portions 12s and 22s, in which it is generally difficult to obtain a reliable and superior joining strength in comparison to the vertical portions 11s and 21s, and the vertical portions 13s and 23s, and a reliable and superior joining strength can be realized across the entire joining parts.

In particular, because the protrusions for welding 21E and 23E of the vertical portions 21s and 23s have the substantially rectangular shape in section the pressurizing direction from the base through the intermediate position thereof and the substantially triangular shape in section at the edge side thereof (that is, the welding margins 21w and 23w), the butting area of the protrusions for welding 21E and 23E in the vertical portions 21s and 23s is increased toward the bases of the protrusions 21E and 23E until the welding in the welding margins 21w and 23w is completed.

Therefore, the welding area in the vertical portions 21s and 23s can be increased as the welding advances without necessarily changing the pressurizing force with respect to the half bodies 10 and 20 though the welding area is relatively small in the initial stage of the welding. As a result, a required joining strength in the vertical portions 11s and 21s and the vertical portions 13s and 23s can be assured.

Because the protrusions for welding 21E, 22E and 23E of the lower half body 20 are arranged to have the substantially rectangular shape in section the pressurizing direction in the tilting portion 22s, the welding area can be substantially constant regardless of the advancement of the welding, which realizes the reliable joining strength. In contrast to that, the welding margins in the vertical portions 21s and 23s have the substantially triangular shape so that the welding area can be increased as the welding advances. As a result, the welding area can be increased as the welding advances without necessarily changing the pressurizing force though the welding area is relatively small in the initial stage of the welding, which leads to the assurance of the required joining strength. Further, the substantially trapezoidal shape is arranged between the vertical portions 21s and 23s and the tilting portion 22s so that a drastic change of the welding area can be alleviated in the joining region from the tilting portion 22s through the vertical portions 21s and 23s. As a result, the reliable and superior joining strength across the entire joining parts can be realized.

Figure 9:
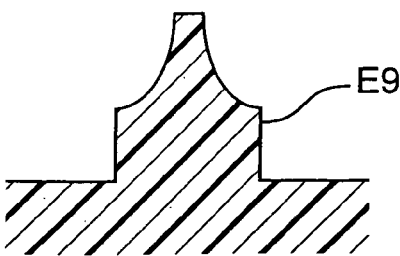
FIG. 9 is a sectional view of a modification example of the protrusion for welding in the vertical portion of the upper half body in the pressurizing direction.
Figure 10:
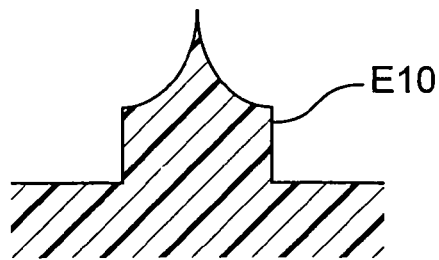
FIG. 10 is a sectional view of a modification example of the protrusion for welding in the vertical portion of the upper half body in the pressurizing direction.
Figure 11:
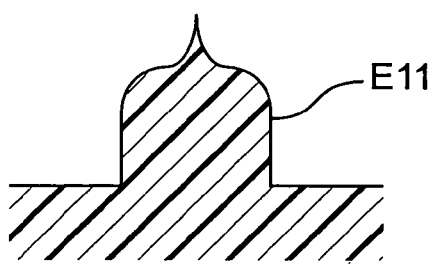
FIG. 11 is a sectional view of a modification example of the protrusion for welding in the vertical portion of the upper half body in the pressurizing direction.
Figure 12:
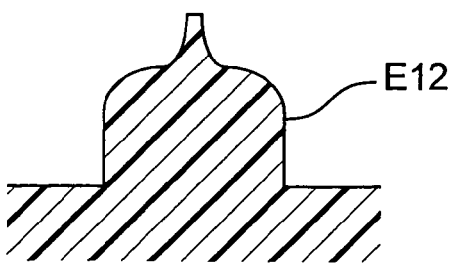
FIG. 12 is a sectional view of a modification example of the protrusion for welding in the vertical portion of the upper half body in the pressurizing direction.
Figure 13:
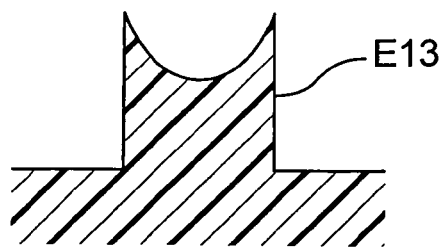
FIG. 13 is a sectional view of a modification example of the protrusion for welding in the vertical portion of the upper half body in the pressurizing direction.
Figure 14:
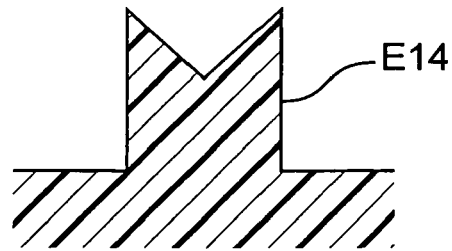
FIG. 14 is a sectional view of a modification example of the protrusion for welding in the vertical portion of the upper half body in the pressurizing direction.

FIGS. 7 through 14 respectively show various examples of modifications of the sectional shape of the protrusion for welding in the pressurizing direction provided in the lower half body 20. In protrusions for welding E7 and E18 shown in FIGS. 7 and 8, the rectangular shape and the triangular shape are combined. The protrusions for welding E9 and E10 shown in FIGS. 9 and 10 is a modification in which a curved line is applied to the triangular shape. A protrusion for welding E11 shown in FIG. 11 has a bell shape, and a protrusion for welding E12 shown in FIG. 12 is a modification of the bell-shaped E11. The protrusions for welding E13 and E14 shown in FIGS. 13 and 14 is a modification in which a recessed portion is provided in a central part in section.

According to the present embodiment, referring to a sectional area of welding margins of the protrusions for welding 21E, 22E and 23E in the lower half body 20 in a direction orthogonal to a butting surface, the sectional area in the tilting portion 22s is set to be equal to or more than the sectional area in the vertical portions 21s and 23s.

When the sectional areas are set as described, a welding amount in the tilting portion 22s can be equal to or more than a welding amount in the vertical portions 21s and 23s in the direction orthogonal to the butting surface so that the joining strength in the tilting portions 21s and 23s, in which it is generally difficult to obtain the reliable and superior joining strength in comparison to the vertical portion 22s, can be enhanced. As a result, the reliable and superior joining strength can be attained in the entire joining parts in a direction orthogonal to a butting surface.

In particular, the sectional area in the tilting portion 22s is arranged to be substantially equal to the sectional area in the vertical portions 21s and 23s so as to minimize a difference between the respective welding amounts in the tilting portion 22s and the vertical portions 21s and 23s. As a result, the joining strength can be more reliable in the entire joining parts.

A simulation for the structure of joining the resin molded bodies constituted as described was carried out, which examined a variation of the welding areas in the vertical portions and the tilting portions and a variation of the pressurizing force (so-called contact pressure) in the direction orthogonal to the butting surface in accordance with the advancement of the welding.

Below is given a description of the simulation.

The simulation was carried out regarding a case in which the welding margin of the protrusion for welding in the tilting portion has the rectangular shape in section in the pressurizing direction (see FIG. 4) as in the conventional case, and the welding margin of the protrusion for welding in the vertical portion has the triangular shape in section in the pressurizing direction (see FIG. 5) and the bell shape (see FIG. 11), and the conventional joining structure in which the welding margins of the protrusions for welding in the vertical and tilting portions both have the rectangular shape in section in the pressurizing direction was used for comparison.

Figure 15:
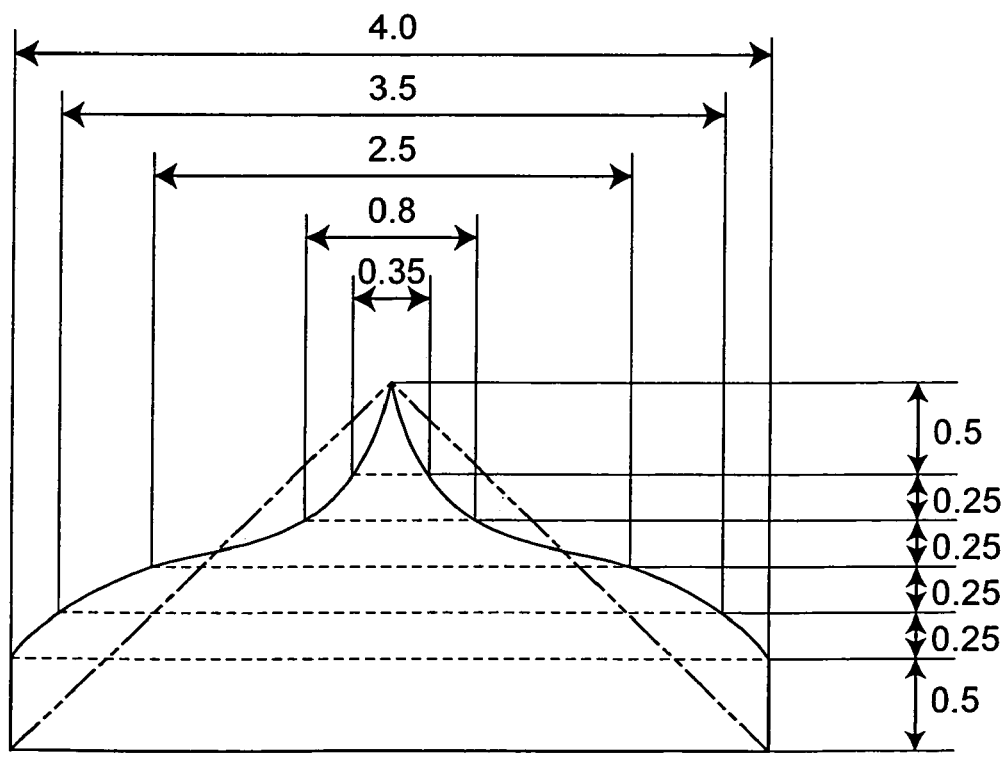
FIG. 15 is an illustration of an example of a welding margin of the protrusion for welding in the vertical portion.

FIG. 15 shows sectional shapes and dimensions in the pressurizing direction in the examples of the welding margin of the protrusion for welding in the vertical portion, which were used in the present simulation. A width of the welding margin is 4.0 mm and a height thereof is 2 mm at maximum in the both examples. An entire sectional area thereof is 4 mm² in the case of the triangular shape and 4.28 mm² in the case of the bell shape. A tilting angle of the tilting portion relative to the pressurizing direction is 45 degrees.

Further, a width of the welding margin in the example of the welding margin of the protrusion for welding in the tilting portion (rectangular shape) is constantly 4.0 mm, and the same values are employed in the vertical and tilting portions in the conventional structure for comparison.

All of the sectional shapes in the pressurizing direction in an opposite welding margin of the joining parts to be butted into the aforementioned welding margin (in both vertical and tilting portions) are rectangular.

In the foregoing joining structure set as above, the welding areas in the vertical portion and the tilting portion and the pressurizing force (so-called contact pressure) in the direction orthogonal to the butting surface in accordance with the advancement of the welding were examined in the case of vibration-weld the welding margins in the foregoing examples by applying a pressure thereto by means of a hydraulic or pneumatic pressurizing device and applying a predetermined vibration in the state in which the welding margins were butted into each other.

In this case, a predetermined pressurizing force of the pressurizing device was set to, for example, 2 MPa, and the welding area and the contact pressure were calculated in each advancement of the welding (sinking) per 0.25 mm. Further, the sectional area of the welding part in the direction orthogonal to the butting surface (that is, welding sectional area) in the respective examples of the welding margin was also calculated.

Figure 16:
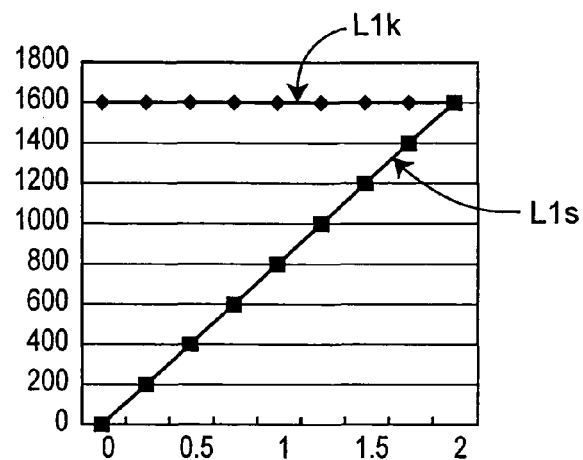
FIG. 16 is a graph showing a variation of a welding area in a direction in parallel with a butting surface in a triangular-shape welding margin in accordance with an advancement of the welding.
Figure 17:
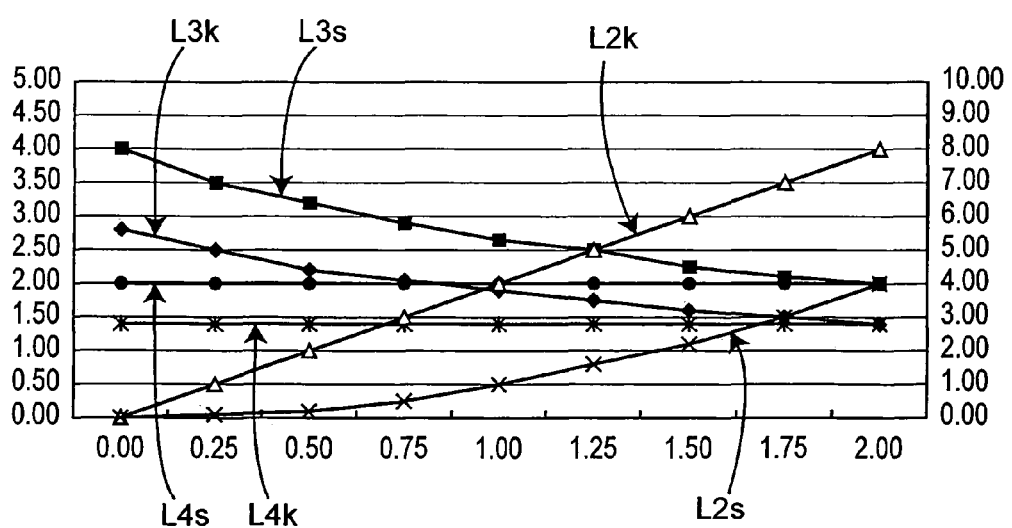
FIG. 17 is a graph showing a variation of a contact pressure and a variation of a welding sectional area in a direction orthogonal to the butting surface in accordance with the advancement of the welding in the case of the triangular-shape welding margin.

Tables 1 and 2 show a calculation result of the example in which the welding margin in the vertical portion has the triangular shape in section in the pressurizing direction (see FIG. 5). FIGS. 16 and 17 show graphs respectively corresponding to the Tables 1 and 2.

The Table 1 and FIG. 16 show a variation of the welding area in a direction in parallel with the butting surface in the case of the triangular shape (so-called plane parallel direction) in accordance with the advancement of the welding.

TABLE 1

| | Welding area in plane parallel direction (mm²) | | | | |
|---|---|---|---|---|---|
| | Tilting portion | | Vertical portion | | |
| Sinking amount (mm) | Welding length (mm) Welding width (mm) | 400 Welding area | Welding length (mm) Welding width (mm) | 400 Welding area | Total welding area |
| 0.00 | 4 | 1600 | 0.00 | 0.0 | 1600.0 |
| 0.25 | 4 | 1600 | 0.50 | 200.0 | 1800.0 |
| 0.50 | 4 | 1600 | 1.00 | 400.0 | 2000.0 |
| 0.75 | 4 | 1600 | 1.50 | 600.0 | 2200.0 |
| 1.00 | 4 | 1600 | 2.00 | 800.0 | 2400.0 |
| 1.25 | 4 | 1600 | 2.50 | 1000.0 | 2600.0 |
| 1.50 | 4 | 1600 | 3.00 | 1200.0 | 2800.0 |
| 1.75 | 4 | 1600 | 3.50 | 1400.0 | 3000.0 |
| 2.00 | 4 | 1600 | 4.00 | 1600.0 | 3200.0 |

The Table 2 and FIG. 17 show a variation of the contact pressure and a variation of the welding area in the direction orthogonal to the butting surface (so-called plane vertical direction) in accordance with the advancement of the welding in the case of the triangular shape.

TABLE 2

| | Present embodiment: contact pressure (Mpa) | | Present embodiment: welding sectional area in plane vertical direction (mm²) | | Comparative example: contact pressure (Mpa) | |
|---|---|---|---|---|---|---|
| Sinking amount (mm) | Tilting portion | Vertical portion | Tilting portion | Vertical portion | Tilting portion | Vertical portion |
| 0.00 | 2.83 | 4.00 | 0 | 0.00 | 1.41 | 2.00 |
| 0.25 | 2.51 | 3.56 | 1 | 0.06 | 1.41 | 2.00 |
| 0.50 | 2.26 | 3.20 | 2 | 0.25 | 1.41 | 2.00 |
| 0.75 | 2.06 | 2.91 | 3 | 0.56 | 1.41 | 2.00 |
| 1.00 | 1.89 | 2.67 | 4 | 1.00 | 1.41 | 2.00 |
| 1.25 | 1.74 | 2.46 | 5 | 1.56 | 1.41 | 2.00 |
| 1.50 | 1.62 | 2.29 | 6 | 2.25 | 1.41 | 2.00 |
| 1.75 | 1.51 | 2.13 | 7 | 3.06 | 1.41 | 2.00 |
| 2.00 | 1.41 | 2.00 | 8 | 4.00 | 1.41 | 2.00 |

In FIG. 16, a straight line L1k denotes the welding area in the tilting portion in the plane parallel direction, and L1s denotes the welding area in the vertical portion in the plane parallel direction. As is clear from the Table 1 and FIG. 16, the welding area in the direction in parallel with the butting surface (plane parallel direction) is constant in the tilting portion. On the contrary, the welding area in the vertical portion linearly increases in accordance with the advancement of the welding (that is, increase of the sinking amount), and consequently equal to the welding area in the tilting portion when the welding in the entire height of the welding margin is completed.

In FIG. 17, a straight line L2k and a curved line L2s respectively denote the welding sectional areas in the tilting and vertical portions in the plane vertical direction, and a curved line L3k an a curved line L3s respectively denote the contact pressures in the tilting and vertical portions. A straight line L4k and a straight line L4s respectively show the contact pressures in the tilting and vertical portions in the comparative example. In the comparative example, the protrusion has the rectangular shape in section in the pressurizing direction in both of the tilting and vertical portions, which is a general joining structure in the conventional technology. As is clear from the Table 2 and FIG. 17, in the present embodiment, the contact pressures in the tilting and vertical portions is higher than in the case of the comparative example until the welding in the entire height of the welding margin is completed. Further, in the present embodiment, the welding sectional area in the tilting portion in the plane vertical direction (see the straight line L2k) is larger than the welding sectional area in the vertical portion in the plane vertical direction (see the curved line L2s).

It is learnt from the foregoing description that the joining strength in the tilting portion, in which it is generally difficult to obtain the reliable and superior joining strength in comparison to the vertical portion, can be enhanced.

Figure 18:
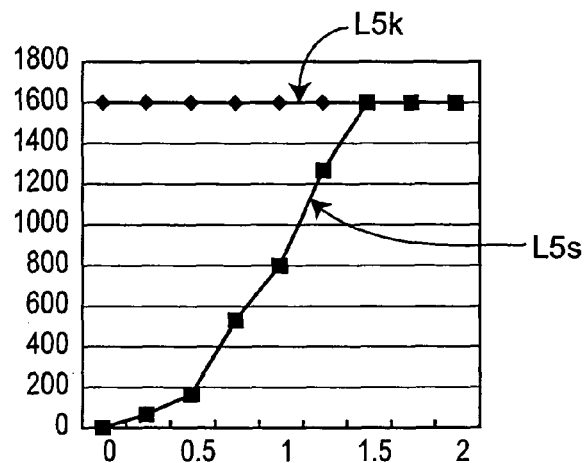
FIG. 18 is a graph showing a variation of a welding area in the direction parallel with the butting surface in accordance with the advancement of the welding in the case of a bell-shape welding margin.
Figure 19:
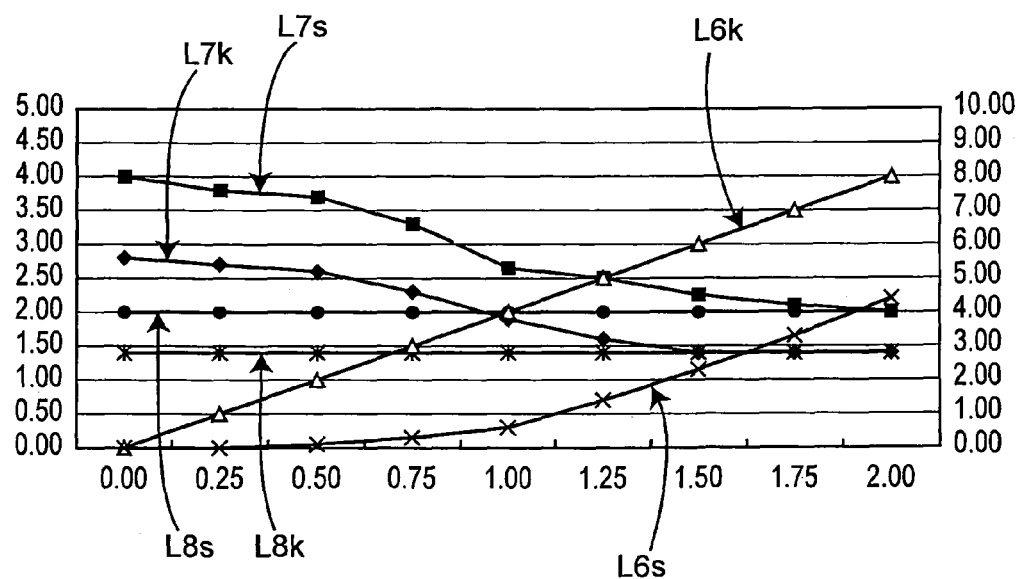
FIG. 19 is a graph showing a variation of a contact pressure and a variation of a welding sectional area in the direction orthogonal to the butting surface in accordance with the advancement of the welding in the case of the bell-shape welding margin.

Tables 3 and 4 show a calculation result of the example in which the welding margin in the vertical portion has the bell shape in section in the pressurizing direction (see FIG. 11). FIGS. 18 and 19 show graphs respectively corresponding to the Tables 3 and 4.

The Table 3 and FIG. 18 shows the variation of the welding area in the direction in parallel with the butting surface (plane parallel direction) in the case of the bell shape in accordance with an advancement of the welding.

TABLE 3

| | Welding area in plane parallel direction (mm²) | | | | |
|---|---|---|---|---|---|
| | Tilting portion | | Vertical portion | | |
| Sinking amount (mm) | Welding length (mm) Welding width (mm) | 400 Welding area | Welding length (mm) Welding width (mm) | 400 Welding area | Total welding area |
| 0.00 | 4 | 1600 | 0.00 | 0.0 | 1600.0 |
| 0.25 | 4 | 1600 | 0.15 | 60.0 | 1660.0 |
| 0.50 | 4 | 1600 | 0.35 | 140.0 | 1740.0 |
| 0.75 | 4 | 1600 | 0.80 | 320.0 | 1920.0 |
| 1.00 | 4 | 1600 | 2.00 | 800.0 | 2400.0 |
| 1.25 | 4 | 1600 | 3.20 | 1280.0 | 2880.0 |
| 1.50 | 4 | 1600 | 4.00 | 1600.0 | 3200.0 |
| 1.75 | 4 | 1600 | 4.00 | 1600.0 | 3200.0 |
| 2.00 | 4 | 1600 | 4.00 | 1600.0 | 3200.0 |

The Table 4 and FIG. 19 show a variation of the contact pressure and a variation of the welding area in the direction orthogonal to the butting surface in the case of the bell shape (plane vertical direction) in accordance with an advancement of the welding.

TABLE 4

| | Present embodiment: contact pressure (Mpa) | | Present embodiment: welding sectional area in plane vertical direction (mm²) | | Comparative example: contact pressure (Mpa) | |
|---|---|---|---|---|---|---|
| Sinking amount (mm) | Tilting portion | Vertical portion | Tilting portion | Vertical portion | Tilting portion | Vertical portion |
| 0.00 | 2.83 | 4.00 | 0 | 0.00 | 1.41 | 2.00 |
| 0.25 | 2.73 | 3.86 | 1 | 0.02 | 1.41 | 2.00 |
| 0.50 | 2.60 | 3.68 | 2 | 0.04 | 1.41 | 2.00 |
| 0.75 | 2.36 | 3.33 | 3 | 0.18 | 1.41 | 2.00 |
| 1.00 | 1.89 | 2.67 | 4 | 0.59 | 1.41 | 2.00 |
| 1.25 | 1.57 | 2.22 | 5 | 1.34 | 1.41 | 2.00 |
| 1.50 | 1.41 | 2.00 | 6 | 2.28 | 1.41 | 2.00 |
| 1.75 | 1.41 | 2.00 | 7 | 3.28 | 1.41 | 2.00 |
| 2.00 | 1.41 | 2.00 | 8 | 4.28 | 1.41 | 2.00 |

In FIG. 18, a straight line L5k denotes the welding area in the tilting portion in the plane parallel direction, and L5s denotes the welding area in the vertical portion in the plane parallel direction. As is clear from the Table 3 and FIG. 18, the welding are in the direction in parallel with the butting surface (plane parallel direction) is constant in the tilting portion. In contrast to that, the welding area in the vertical direction increases along a certain curved line in response to the advancement of the welding (that is, the increase of the sinking amount) and is consequently equal to the welding area in the tilting portion when the sinking amount reaches 1.5 mm.

In FIG. 19, a straight line L6k and a curved line L6s respectively denote the welding areas in the tilting portion and the vertical portion in the plane vertical direction, and a curved line L7k and a curved line L7s respectively denote the contact pressures in the tilting portion and the vertical portion. Further, a straight line L8k and a straight line L8s respectively denote the contact pressures in the tilting and vertical portions in the comparative example. The comparative example is a general joining structure similar to the conventional joining structure shown in FIG. 17.

As is clear from the Table 4 and FIG. 19, in the present embodiment, the contact pressure in the vertical portion is higher than the contact pressure in the comparative example until the welding in the entire height of the welding margin is completed, and the contact pressure in the tilting portion is larger than the contact pressure in the comparative example until the sinking amount reaches 1.5 mm and is thereafter equal to the contact pressure in the comparative example. Further, in the present embodiment, the welding sectional area in the tilting portion in the plane vertical direction (see the straight line L6k) is larger than the welding sectional area in the vertical portion in the plane vertical direction (see the curved line L6s).

It is learnt from the foregoing description that the joining strength in the tilting portion, in which it is generally difficult to obtain the reliable and superior joining strength in comparison to the vertical portion, can be enhanced.

It is needless to say that the present invention is not limited to the foregoing embodiment, and can be variously modified or corrected without departing from the spirit and the scope of the present invention.

What is claimed is:

1. A welding method for joining a joining structure for joining a pair of upper and lower resin molded bodies, comprising:
    applying a vibration to the pair of upper and lower resin molded bodies while applying a pressure in a vertical pressurizing direction to the pair of resin molded bodies in a state in which joining parts of the pair of resin molded bodies are butted into each other across a substantially entire area thereof, wherein:
    the joining parts of each of the upper and lower resin molded bodies comprise first and second regions extending in a direction perpendicular to the pressurizing direction, a third region displaced in the vertical pressurizing direction away from the first and the second regions and extending in the direction perpendicular to the vertical pressurizing direction, and fourth and fifth regions extending in a direction tilting relative to the vertical pressurizing direction;
    the first, second, third, fourth and fifth regions of the upper resin molded body respectively correspond to and mate with the first, second, third, fourth and fifth regions of the lower resin molded body;
    the third region extends between respective first ends of the fourth and fifth regions;
    the first and second regions have first ends connected to respective second ends of the fourth and fifth regions;

the joining parts constituted as the first, second, third, fourth and fifth regions being continuous, wherein the joining parts form a saddle shape;

the first, second, third, fourth and fifth regions of at least one of the upper and lower molded bodies comprise protrusions for welding; and a butting area viewed in lateral cross section of the protrusions in the first, second and third regions is less than a butting area of the protrusions in the fourth and fifth regions in the state in which the joining parts are butted.

* * * * *